Patented July 30, 1946

2,405,078

UNITED STATES PATENT OFFICE 2,405,078

METHOD AND COMPOSITIONS FOR LOCATING SURFACE DISCONTINUITIES

Richard A. Ward, Cleveland, Ohio, assignor, by mesne assignments, to Robert C. Switzer, South Euclid, Ohio, and Joseph L. Switzer, Cleveland Heights, Ohio No Drawing. Application April 18, 1944,
Serial No. 531,648

28 Claims. (Cl. 250—71)

This invention relates to improved methods and agents for locating surface discontinuities or flaws in test bodies. The united States Patent No. 2,259,400, granted to Robert C. Switzer on October 14, 1941, for Flaw detection, discloses methods of detecting subsurface flaws in substantially solid bodies comprising the steps of applying to the surface of the test body a luminescent testing agent which will penetrate the surface openings of subsurface flaws, removing the portion of the luminescent testing agent remaining on the surface of the body and then inspecting the surface of the body for the portion of the testing agent which had penetrated into the surface openings of the subsurface flaws and which reappears at or on the surface of the body. This invention, more particularly, relates to an improvement in the foregoing Switzer method and to an improved testing agent for use in the said Switzer method and this improved method. This application is a continuation-in-part of the copending application, Serial No. 446,820, filed June 12, 1942.

The aforesaid Switzer method has been a particularly successful non-destructive testing method for locating surface discontinuities, such as blow-holes and the like in cast bodies, and fatigue cracks, grinding cracks and the like in finished bodies. An especial advantage of the aforesaid method is that the composition of the test bodies generally has no effect on the efficacy of the method. The method has been employed successfully for locating surface discontinuities in non-metallic bodies as well as in both magnetic and non-magnetic metallic bodies. Due to the theoretically infinite contrast ratio afforded by the light-emitting testing agent and the non-luminescent body when the article is, in the preferred embodiment of the method, inspected in an absence of incident visible light, fine surface cracks are easily seen with the naked eye even though such surface cracks are substantially submicroscopic in size and cannot be readily detected by visual or X-ray inspection.

Several problems have arisen in the production testing by the aforesaid Switzer method of finished metal parts, for example, particularly when the determination of the extent and location of substantially submicroscopic flaws is sought. First, very fine cracks, particularly those having only a short surface opening, are penetrated very slowly by the testing agents. Second, as a corollary, when the testing agent penetrates fine cracks very slowly, the testing agent will reappear at or on the surface very slowly. Third, it is another almost universal corollary that testing agents which will penetrate such fine cracks will also have great surface wetting properties and are, consequently, difficult to remove from the surface of the bodies being tested so that false indications will not be obtained. Fourth, in order to remove such thorough penetrating agents without affecting or destroying the finished surface of the body, suitable solvents or the like may be employed, but such solvents are usually expensive and large quantities must often be employed. Fifth, in removing the testing agent from the surface of the body, care must be exercised so that the testing agent will not also be removed from the flaws to be detected.

It is the object of this invention to overcome the foregoing problems to improve the speed and convenience of production testing. Specifically, it is an object of this invention to provide a method or procedure which will accelerate not only the penetration of the testing agent into the flaws in the body being tested, but also the removal of the testing agent from the surface of the body and the reappearance on the surface of the body of the testing agent retained in the flaws. It is another object of this invention to provide a suitable testing agent which will rapidly penetrate the openings of fine flaws but which may be rapidly and thoroughly removed from the surface of the test body by inexpensive agents without being removed from the flaws in the test body. These objects are accomplished by heating the test body, cooling the test body in a water-emulsifiable luminescent testing agent, washing the testing agent from the test body, reheating the test body and/or applying an absorbent for the testing agent to the surface of the cleaned test body. The test body is then inspected under suitable lighting conditions as described in the aforesaid Switzer patent.

Admittedly, this improved method of testing may not appreciably increase the ultimate accuracy of the testing method disclosed in the aforesaid Switzer patent nor do the testing agents as disclosed herein necessarily reveal any finer flaws. By testing according to this invention, however, one may obtain very rapid results which satisfy most practical standards and which also approach, if not equal or exceed, the ultimate accuracy of the methods as disclosed in the aforesaid Switzer patent. Any additional steps required by this invention are generally more than offset by its suitability to rapid and efficient production testing.

Other objects and advantages of this invention will be apparent from the following detailed specification and the claims.

In general, the method of testing according to this invention comprises five preferred steps which may be carried out in several different ways. The five preferred steps are: first, heating the test body; second, cooling the test body while at least the portion of the surface to be tested is covered with a flaw-penetrating testing agent which is luminescent and usually fluorescent under suitable invisible fluorescigenous radiation and which is also preferably but not necessarily water-emulsifiable; third, removing the portion of the testing agent remaining on the surface of the body, as by flushing the body with water when the preferred water-emulsifiable agent is used; fourth, driving or drawing on or to the surface of the body a portion of the testing agent retained in the flaws; and fifth, inspecting the test body under suitable lighting conditions which will permit the location and extent of flaws to be revealed by the light emitted by the luminescent testing agent reappearing at or on the surface of the test body. Specific examples of each of the steps are given below, but it is to be understood that the following examples are given by way of illustration and are not to be considered as limitations.

The body to be tested is preferably cleaned prior to heating. If the test body is a machined and finished metal part, for example, the suitable temperature to which it is heated can usually range between 90° and 160° C. Several factors must be taken into account to determine the maximum temperature to which the test body is to be heated, such as, for example, the physical deformation and stresses caused by heating, the effect on the temper of the body of the heating and subsequent cooling, the baking or carbonization, on the surface and in the flaws of the body, of residual films of cutting oil and the like, the oxidation of the surface of the body, and the dissociation, volatilization and flash point of the testing agent which may be applied to the heated body. The test body can usually be heated quickly by soaking it in a vat of boiling water, although superheated steam, ovens, infra-red radiation, induced electric currents, hot solvents which may remove surface films, or other equivalent means, may be employed where expedient. When the test body is very large or unwieldy, localized areas, rather than the whole body, may be heated. If the body is heated with a liquid, it is often preferable to dry the body by superheated steam, hot air, or simply allowing the heat of the body to vaporize the liquid after removing the body from the heating liquid and before applying the testing agent. If inflammable liquids are employed, suitable precautions against fire should be taken; because of the general availability of the medium and the absence of a fire hazard, hot water is usually preferred for heating the test body.

The test body is then allowed to cool while the portion of the surface to be tested is covered with the testing agent. This is usually accomplished by simply immersing the heated test body in a bath of the testing agent maintained at approximately room temperature. While the test body is being cooled in the bath of the testing agent, the testing agent quickly penetrates the surface openings of the flaws. By the time the test body has been cooled to approximately room temperature, the testing agent will usually have penetrated all detectable flaws, although the time the test body is allowed to remain in the bath of the testing agent may depend upon the penetrating ability of the testing agent and the degree of fineness of the flaws desired to be revealed. As pointed out above, a preferred testing agent is a water-emulsifiable luminescent liquid capable of penetrating the flaws to be revealed. Specific examples of suitable testing agents are given below.

After the test body has been immersed in the testing agent, the body is removed from the bath and excess testing agent is allowed to drain off. The testing agent remaining on the surface of the body is then washed off with wash water. To wash off the testing agent, the body may be simply sloshed in a vat or subjected to streams or sprays of wash water. If streams or sprays are employed, it is preferable that they should be no more forceful than necessary to wash the testing agent off the surface of the test body. The washed test body is then drained of wash water and may be dried by streams of warm air to evaporate wash water. Other procedures may be employed to remove excess wash water, such as by wiping the test bodies with absorbent cloths or by preferentially wetting the surface with another liquid according to the disclosure of the copending application of Taber de Forest for Wet developer, Serial No. 563,798, filed November 16, 1944.

After the testing agent has been washed from the surface of the test body, a portion of the testing agent which penetrated the surface openings of the subsurface flaws in the body is forced or drawn to or on the surface of the body. In many instances sufficiently accurate results are obtained by either heating the body or by applying on the surface of the body a fine light-reflecting agent, termed a "developer," which apparently absorbs the testing agent by capillary attraction. For best results both an absorptive agent and heat are employed. A satisfactory light-reflecting absorptive agent is French talc, applied in either a dry finely powdered state or as a thin suspension. Other satisfactory developers are disclosed in the above identified application of Taber de Forest and, if the developer is one which preferentially wets the test body, the steps of removing wash water and developing may be conducted simultaneously.

The body is then inspected under suitable lighting conditions which will permit the light emitted by the luminous agent in or adjacent the surface openings of the flaws to contrast with the surface of the body. Usually the test bodies are inspected visually in darkened rooms or booths under sources of ultraviolet light from which nearly all visible light has been filtered. Under such conditions, the substantial absence of incident visible light upon the test body and the high concentration of light emitted by the fluorescing testing agent affords such a high contrast ratio that the location and extent of very minute flaws is readily detectible. When French talc is employed as an absorptive agent, not only is the testing agent apparently drawn out of the flaws by the capillary attraction of the talc so that the talc is wetted and tends to cling to the surface of the body adjacent the flaw openings, but also the white talc reflects visible light emitted by the luminescent testing agent, which light might otherwise be absorbed by the dark surface of the test body. Any other suitable lighting conditions which will afford a high contrast between the luminescent testing agent and the test body may obviously be employed. Also, light-sensitive means other than the human eye, such as a photographic camera or a photo-electric cell, may be employed to respond to the contrast between the testing agent and the test body.

A suitable testing agent for use with the foregoing method should exhibit several essential characteristics, namely, excellent penetrating and surface wetting properties, water-emulsifiability, and brilliant fluorescence. The unique characteristic of such testing agents as compared with the testing agents disclosed in the aforesaid Switzer patent is that of water-emulsifiability. It has been discovered that this characteristic allows the testing agent to be washed off the surface of the test body without being appreciably washed out of the flaw openings. These three characteristics are usually obtained by compounding the testing agent of a penetrant, a fluoragent, and an emulsifying agent which renders the testing agent water-emulsifiable. The penetrant is a water-insoluble oil or like liquid; it may be a single petroleum or hydrocarbon fraction or a number of them proportioned to give the penetrant good metal wetting characteristics, low surface tension, low volatility, suitable viscosity, and proper solvent power for the other constituents. The fluoragent is an ingredient foreign, i. e., added, to the other ingredients of the testing agent. The fluoragent should preferably impart such fluorescence to the testing agent and so enhance any natural fluorescence of the penetrant and/or the emulsifying agent that thin films of the testing agent will fluoresce with a distinctive brightness and color under ultra-violet, that is, the fluorescent light emitted by the fluoragent is preferably of such a dominant wave-band that the fluorescent light emitted by the testing agent is of a dominant wave-band different from the dominant wave-band of light which may be emitted by the penetrant, the emulsifying agent, and/or extraneous substances likely to be present on the surface of the test body. Several satisfactory fluoragents are commercially available and are generally known as oil-soluble fluorescent dyes. The emulsifying agent is usually composed of one or more oil-soluble soaps, detergents, or other surface-tension reducing agents which render the testing agent "self-emulsifying," that is, the testing agent will emulsify directly in water; in some instances it may be expedient to employ soaps or detergents which are not in themselves oil-soluble but which may be held in solution by a mutual solvent or coupling agent (often an alcohol) for the actual emulsifier and the oil; for the purposes of this invention, such mutual solvents or coupling agents may simply be considered a part of the emulsifying agent. It is not essential to incorporate the emulsifying agent in the testing agent. Instead, the emulsifying agent may be incorporated in the wash water; in such instances, the testing agent may, for the purposes of this invention, be considered "emulsifiable" but not "self-emulsifying."

In formulating a specific testing agent, numerous variables must be considered. In selecting a specific penetrant to be employed, one should select a penetrant which will thoroughly wet the surface of the specific type of article to be tested. For example, penetrants which are excellent for metal may be less satisfactory for plastics and ceramics. The type of discontinuity likely to be found is also a factor in selecting a proper penetrant. If the flaws are likely to be blowholes, shrinkage cracks, or similar flaws having relatively large volumes and open surface openings such as may be found in cast metal articles, one may often use a penetrant which does not have the extremely thorough wetting properties and low viscosity necessary in a penetrant used for locating discontinuities having relatively closed surface openings such as grinding cracks, forging bursts, and the like. In selecting an emulsifying agent, one should avoid those which tend to form scums or sludges with the penetrant selected. The concentration of emulsifying agent is dependent not only upon the efficacy of the specific agent but also upon the type of discontinuity likely to be found. If the flaws are likely to be shallow, the testing agent should be removable by a very gentle washing; if the flaws are likely to be deep and with relatively closed surface openings, the concentration of emulsifying agent may be decreased to permit complete emulsification to be obtained with the aid of sprays exerting a strong scrubbing action. Nearly all effective fluoragents exhibit substantially maximum fluorescent brightness at very low concentration in the testing agent; greater concentration may actually decrease fluorescent brightness. Fluoragents, therefore, are usually selected on the basis of inherent fluorescent brightness and stability in the testing agent.

From the foregoing it is apparent that in the testing agents the proportions of penetrant and emulsifying agent may vary widely whereas the proportion of fluoragent will usually be very low for all types of testing agents. In any given case the proportions will depend upon the requirements of the articles to be tested and the properties of the specific ingredients, but in general the concentration of penetrant may vary from approximately fifty to ninety-seven percent by weight, the concentration of emulsifying agent many vary from approximately three to fifty percent by weight, and the concentration of fluoragent may vary from approximately one-tenth of one percent to one percent by weight.

Illustrative but not limitative examples of suitable testing agents are as follows:

*Example 1*

|   | Per cent by weight |
|---|---|
| 1. Straight-run petroleum distillate, 300° F. fire point | 83 |
| 2. Di (octadecyl carbonic) ester of leuco dimethoxy dibenzanthrone | 0.3 |
| 3. Naphthenic acid soap (molecular weight about 350) | 16.7 |

*Example 2*

|   | Per cent by weight |
|---|---|
| 1. Kerosene | 77.6 |
| 2. Perylene | 0.4 |
| 3. Octylaminoethanol soap of tetradecyl sulfuric acid | 22 |

*Example 3*

|   | Per cent by weight |
|---|---|
| 1. Kerosene | 49 |
| 2. Dinaphthylene oxide | 1 |
| 3. Sodium salt of mahogany acid | 50 |

*Example 4*

|   | Per cent by weight |
|---|---|
| 1. Kerosene | 54.64 |
| 2. Di (octadecyl carbonic) ester of leuco dimethoxy dibenzanthrone | 0.36 |
| 3. {Sodium dodecyl benzenesulphonate | 18 |
| {Cyclohexanol | 27 |

In this example, the cyclohexanol serves as a mutual solvent for the penetrant, kerosene, and the emulsifying agent, sodium dodecyl benzenesulphonate. The cyclohexanol may, therefore, be considered part of the emulsifying agent.

Example 5

| | Per cent by weight |
|---|---|
| 1. { "Texaco" penetrating oil | 67.9 |
|    { Ethylene glycol monobutyl ether | 16 |
| 2. Ethyl ester of meta monoethylaminophenol phthalein | 0.1 |
| 3. Naphthenic acid soap | 16 |

In this example ethylene glycol monobutyl ether serves to maintain the fluoragent in solution in the penetrant and may, therefore, be considered either part of the penetrant or part of the fluoragent. In this connection, it should also be pointed out that many fluoragents as sold commercially are dissolved in diluent vehicles. The concentration of active fluoragent in any of the foregoing examples is stated on the basis of a pure fluoragent undiluted by impurities or commercial diluent vehicles.

Example 6

| | Per cent by weight |
|---|---|
| 1. { Kerosene | 73.5 |
|    { S. A. E. 50 motor oil | 22 |
| 2. Di (octadecyl carbonic) ester of leuco dimethoxy dibenzanthrone | 1.5 |
| 3. Refined sulphonated aromatic petroleum fractions [approximate empirical formula: $C_{26}H_{25}SO_3Na$; approximate molecular weight: 430] | 3 |

When inspecting test bodies according to the above described methods, it is often desirable to inspect the test body while the testing agent is being drawn or forced out of the flaws in order to obtain a qualitative as well as a quantitative analysis of the flaws. Thus, for example, where the testing agent first appears as a thin bright line and then widens without diminishing in brightness, a narrow deep crack will be indicated; where the testing agent appears as a comparatively wide line and then diminishes in brightness as the line widens, a wide and shallow crack is indicated.

It is also to be understood that this invention, particularly with respect to the testing agent, is not to be limited to the embodiments disclosed, which were given by way of example, but that this invention may be modified and varied by those skilled in the art. The limitations of this invention, therefore, are not set forth in the foregoing specification but in the following claims.

What is claimed is:

1. The method of detecting in a test body subsurface flaws having surface openings comprising the steps of applying to the surface of the body a water-emulsifiable luminescent testing agent which will penetrate the surface openings of the subsurface flaws, washing the testing agent from the surface of the body, and exuding from the surface openings of the flaws a portion of the testing agent which had penetrated into the flaws, whereby the location and extent of the flaws will be revealed by the visible light emitted by the luminescent testing agent on the surface of the test body.

2. The method as defined in claim 1 including the step of subjecting the test body to fluorescigenous radiations to cause the testing agent to fluoresce.

3. The method as defined in claim 1 including the steps of subjecting the test body to fluorescigenous radiations in the substantial absence of visible light and inspecting the surface of the test body with light-sensitive means, whereby the presence of flaws will be revealed by visible light emitted by the testing agent.

4. The method of detecting in a test body subsurface flaws having surface openings comprising the steps of heating the test body, applying to the surface of the test body a fluorescent testing agent which penetrates the surface openings of the subsurface flaws, cooling the test body, removing the testing agent from the surface of the body, exuding from the surface openings of the flaws a portion of the testing agent which had penetrated the surface openings of the flaws, and then inspecting the test body under fluorescigenous radiation.

5. The method as defined in claim 4 in which the step of exuding the testing agent comprises the step of applying a light-reflecting capillary absorptive agent to the surface of the test body.

6. The method as defined in claim 4 in which the step of exuding the testing agent comprises the step of reheating the test body.

7. The method as defined in claim 4 in which the step of exuding the testing agent comprises the steps of applying a light-reflective capillary absorptive agent to the surface of the test body and reheating the test body.

8. The method of testing a body for surface discontinuities comprising the steps of heating the body in a hot liquid, drying the body, immersing the body in a bath of a cooler water-emulsifiable fluorescent testing agent which penetrates the surface discontinuities of the body, washing the testing agent from the surface of the body with water, applying a light-reflecting capillary absorptive agent to the surface of the body, reheating the body, and then inspecting the body under ultraviolet light in a substantial absence of incident visible light.

9. The method as defined in claim 8 in which the step of reheating the body is conducted simultaneously with the step of inspecting the body.

10. In a method of detecting in a test body subsurface flaws having surface openings, the steps of immersing the test body in a bath of a luminescent testing agent which is relatively cooler than the test body and which penetrates the surface openings of the subsurface flaws, removing the test body from said bath, removing the testing agent from the surface of the body, and then examining the test body with light-sensitive means for visible light emitted by the portion of the testing agent which had penetrated into the subsurface flaws and appears at the surface openings of said flaws.

11. In a method of detecting in a test body subsurface flaws having surface openings, the steps of applying to the surface of a test body a water-emulsifiable luminescent testing agent which will penetrate the surface openings of the subsurface flaws, washing the testing agent from the surface of the body, subjecting the test body to fluorescigenous radiation in the substantial absence of visible light, and inspecting the surface of the test body with light-sensitive means, whereby the presence of flaws will be revealed by visible light emitted by the testing agent retained in the surface openings of the subsurface flaws during the step of washing the testing agent from the surface of the test body.

12. The method of detecting in a test body subsurface flaws having surface openings comprising the steps of heating the test body, applying to the surface of the test body a relatively cooler fluorescent testing agent which penetrates the surface openings of the subsurface flaws, cooling the test body, removing the testing agent from the surface of the test body, and then inspecting the test body under fluorescigenous radiation, whereby the presence of flaws will be revealed by visible light emitted by the testing agent retained in the surface openings of the subsurface flaws during the step of removing the testing agent from the surface of the body.

13. In a method of detecting in a test body subsurface flaws having surface openings, the steps of applying to the surface of a test body a luminescent testing agent which is relatively cooler than the test body and which penetrates the surface openings of the subsurface flaws, removing the testing agent from the surface of the body, and then examining the test body with light-sensitive means for visible light emitted by the portion of the testing agent which had penetrated into the subsurface flaws and appears at the surface openings of said flaws.

14. The method of testing a body for surface discontinuities comprising the steps of heating the body in a hot liquid, drying the body, immersing the body in a bath of a cooler water-insoluble emulsifiable fluorescent testing agent which penetrates the surface discontinuities of the body, washing the testing agent from the surface of the body with water in the presence of an emulsifying agent for the testing agent, applying a light-reflecting capillary absorptive agent to the surface of the body, reheating the body, and then inspecting the body under ultra-violet light in a substantial absence of incident visible light.

15. The method as defined in claim 1 in which the step of exuding the testing agent comprises the step of applying a light-reflecting capillary absorptive agent to the surface of the test body.

16. A testing agent for testing bodies for surface discontinuities comprising a water-insoluble self-emulsifying flaw-penetrating oily liquid and a fluoragent soluble in said liquid.

17. A testing agent for testing bodies for surface discontinuities comprising a water-insoluble oily liquid, a fluoragent soluble in said liquid, and an emulsifying agent soluble in said liquid to render the testing agent self-emulsifying in water.

18. A testing agent for testing bodies for subsurface flaws having surface openings comprising a penetrant comprised of a light petroleum distillate, a fluoragent dissolved in said penetrant, and an emulsifying agent dissolved in said penetrant to render the testing agent self-emulsifying in water.

19. A testing agent for testing metal bodies for subsurface flaws having surface openings comprising a penetrant comprised of a plurality of metal-wetting water-insoluble oils, a fluoragent dissolved in said penetrant, and an oil-soluble soap dissolved in said penetrant in sufficient concentration to render said penetrant self-emulsifying.

20. A testing agent for testing bodies for surface discontinuities comprising a penetrant comprised of a water-insoluble oily liquid, an emulsifying agent dispersible in said penetrant to render the testing agent self-emulsifying in water, and a fluoragent soluble in said penetrant and foreign to other ingredients of the testing agent.

21. A testing agent as defined in claim 20 in which said fluoragent comprises an oil-soluble fluorescent dye emitting, when in solution and subjected to invisible fluorescigenous radiations, a dominant wave-band of visible light different from the dominant wave-band of any fluorescent light emitted by said penetrant and said emulsifying agent, the concentration of said fluoragent in the testing agent being in excess of one-tenth of one percent to impart a brightness and fluorescent color to said testing agent which is distinctive from any natural fluorescence of said penetrant and said emulsifying agent.

22. A testing agent as defined in claim 20 in which said fluoragent comprises a fluorescent dye and a mutual solvent for said dye and said penetrant, said dye emitting, when in solution and subjected to fluorescigenous radiations, visible light distinctive from any natural fluorescence of said penetrant and said emulsifying agent, the concentration of said dye in the testing agent being in excess of substantially one-tenth of one percent to impart a distinctive brightness and color to the testing agent.

23. A testing agent as defined in claim 20 in which the concentration of said penetrant in the testing agent ranges between substantially fifty percent and ninety-seven percent by weight of the testing agent.

24. A testing agent as defined in claim 20 in which the concentration of said emulsifying agent in said testing agent ranges between substantially three percent and fifty percent by weight of the testing agent.

25. In a method of detecting in a test body subsurface flaws having surface openings, the steps of applying to a surface of the test body a water-emulsifiable luminescent testing agent which will penetrate into the surface openings of the subsurface flaws and which contains a fluoragent foreign to the other ingredients of the testing agent, washing the testing agent from the surface of the test body with an aqueous washing medium, removing the washing medium from the surface of the test body, subjecting the test body to fluorescigenous radiations and then inspecting the surface of the test body, whereby the presence of subsurface flaws having surface openings will be revealed by visible light emitted by the testing agent retained in the surface openings of the flaws during the step of washing the testing agent from the surface of the test body.

26. In a method of detecting in a test body subsurface flaws having surface openings, the steps of applying to a surface of the test body a luminescent liquid testing agent which will penetrate into the surface openings of the subsurface flaws and which contains a fluoragent, washing the testing agent from the surface of the test body with an aqueous washing medium capable of emulsifying said liquid testing agent, removing the washing medium from the surface of the test body, subjecting the test body to fluorescigenous radiations and then inspecting the surface of the test body, whereby the presence of subsurface flaws having surface openings will be revealed by visible light emitted by the testing agent retained in the surface openings of the flaws during the step of washing the testing agent from the surface of the test body.

27. The method of detecting surface flaws in a body comprising the steps of immersing the body in a solution emulsifiable in water and containing a fluorescent substance, washing the excess solution from the surface of the body with water, drying the surface of the body, and then subjecting the body to fluorescigenous radiations.

28. The method of detecting flaws in a body comprising the steps of heating the body, applying to the surface of the body a relatively cool fluorescent solution which will penetrate into the surface flaws of the body, cleaning the surface of the body to remove the excess solution, and then subjecting the body to fluorescigenous radiations.

RICHARD A. WARD.